June 2, 1953     S. M. CANTOR     2,640,852
PROCESS FOR THE RECOVERY OF ACONITIC
ACID FROM ITS ALKALINE EARTH SALTS
Filed Aug. 12, 1950     4 Sheets-Sheet 1

INVENTOR.
Sidney M. Cantor
BY
ATTORNEYS

Patented June 2, 1953

2,640,852

UNITED STATES PATENT OFFICE 2,640,852

PROCESS FOR THE RECOVERY OF ACONITIC ACID FROM ITS ALKALINE EARTH SALTS

Sidney M. Cantor, Overbrook Hills, Pa., assignor to The American Sugar Refining Company, New York, N. Y., a corporation of New Jersey Application August 12, 1950, Serial No. 179,052

11 Claims. (Cl. 260—537)

This invention relates to an improved process for the production of aconitic acid from its alkaline earth salts, and more particularly from the calcium magnesium aconitate salts recovered from molasses.

The object of the invention is to provide a practicable process for recovering pure crystalline aconitic acid from its alkaline earth salts.

Aconitic acid, which is an unsaturated tricarboxylic acid, occurs widely in plants and particularly in giant grasses, such as the sugar cane and cane sorghum. The acid is recovered from the juices of these plants by precipitation in the form of alkaline earth salts from the concentrated juices or molasses, after removal of the greater portion of their sugar content. The salts so obtained are in the form of crude calcium magnesium aconitates. The production of such alkaline earth aconitates is described in United States Patents 2,280,085; 2,359,537; 2,469,090 and 2,481,557.

It has been proposed in United States Patent 2,345,079 to treat such alkaline earth salts of aconitic acid with an excess of sulfuric acid to displace the aconitic acid from its salts, with resulting precipitation of insoluble sulfates, largely calcium sulfate, leaving the soluble sulfates, largely magnesium sulfate, in solution, and to separate the aconitic acid and magnesium sulfate from the resulting solution, after treatment with decolorizing carbon, by concentration and fractional crystallization, with final neutralization of the acid of the residual liquid with calcium carbonate and return of the precipitated calcium salts to the process.

The present invention provides an improved process for the treatment of alkaline earth aconitates with sulfuric acid and the recovery of aconitic acid which avoids the use of excess sulfuric acid for the treatment and in which the cationic impurities, largely magnesium ion, are removed from the solution prior to the crystallization of aconitic acid therefrom. The improved process also includes the treatment of the crude alkaline earth aconitates with sulfuric acid under conditions which minimize the amount of coloring substances present in the resulting solution, and in which the solution is further treated to remove coloring matter therefrom by the use of decolorizing resins prior to the crystallization of the aconitic acid. The invention includes a process with a combination of steps, and improvements in the different steps and subcombinations thereof.

According to the present invention the crude alkaline earth aconitate salts precipitated from sugar juices or molasses and consisting mainly of calcium magnesium aconitates are first treated with an amount of sulfuric acid sufficient to precipitate the calcium as insoluble calcium sulfate and present in such excess that the solutions obtained, after filtration, contain essentially aconitic acid, cations (e. g. magnesium, calcium and hydrogen), and sulfate ion. This solution, after a decolorizing treatment, is passed through a strong acid cation exchange resin to effect removal of magnesium and other metal cations therefrom to give a solution of aconitic acid free from both calcium and magnesium. This solution is then concentrated and aconitic acid crystallized therefrom.

The crude calcium magnesium aconitate salts are advantageously first thoroughly washed with water to remove soluble impurities and particularly soluble coloring materials.

In the acid treatment of the calcium magnesium aconitate salts maximum extraction of the aconitic acid is obtained by the use of an equivalent ratio, i. e., a ratio expressed in terms of equivalents, of sulfuric acid to aconitic acid equal to or greater than 0.65. It has further been determined that it is not advantageous to exceed an equivalent ratio of sulfuric acid to aconitic acid greater than 1.1 and may in fact be undesirable since any unnecessary excess of sulfuric acid is present in the liquors subsequently obtained by filtration of the mixture. The pH values of the acidified slurries over this preferred range are between the limits of 3.0 and 1.0 corresponding to the aforementioned equivalent ratio limits of 0.65 and 1.1 respectively. The efficiency of the aconitic acid extraction decreases when the equivalent ratio of sulfuric acid to aconitic acid falls below 0.65 corresponding to a slurry pH value higher than 3.0. Within the range of equivalent ratios between 0.65 and 1.1, the amount of ash in the extracted aconitic acid solutions is greatest at 0.65 and gradually decreases to a minimum at an equivalent ratio of 1.0.

If it is desirable to obtain an aconitic acid solution of minimum ash content the acidification may advantageously be carried out by operating within the equivalent ratios 0.95 to 1.05 corresponding to a range in the pH value of 2.1 to 1.4. Thus the extraction of aconitic acid may be carried out in such a manner that, after filtration, the amount of ash to be removed from the aconitic acid solution is kept at a minimum.

The relationship between the amounts of ash present in the solutions obtained by treatment with sulfuric acid and the equivalent ratio of sulfuric acid to aconitic acid used in such acidification is probably dependent upon the composition of the calcium magnesium aconitate salts employed. The general formula expressing the relative amounts of calcium and magnesium present in a calcium magnesium aconitate salt may be expressed by the chemical formula $$Ca_xMg_yAcon_2 \cdot 6H_2O$$

where $x$ plus $y=3$. The crystals vary in magnesium content, depending upon the ratio of the calcium ion to the magnesium ion in the molasses, generally between the limits represented by the chemical symbols $$Ca_{2.75}Mg_{0.25}Acon_2 \cdot 6H_2O$$

and $$Ca_2MgAcon_2 \cdot 6H_2O$$

Thus, although efficient extraction of aconitic acid may be obtained by the employment of an equivalent ratio of sulfuric acid to aconitic acid equal to 0.67 or 2/3 in the treatment of a salt of the composition expressed in the following reaction $$Ca_{2.5}Mg_{0.5}Acon_2 + 2H_2SO_4 \rightarrow 2CaSO_4 + Mg_{0.5}Ca_{0.5}HAcon + H_3Acon$$

it is seen from a consideration of the products of the reaction that considerable calcium as well as magnesium will be present in the solution obtained, giving a relatively high ash.

However, if an equivalent ratio of sulfuric acid to aconitic acid equal to 1.0 is employed as expressed in the following reaction $$Ca_{2.5}Mg_{0.5}Acon_2 + 3H_2SO_4 \longrightarrow$$
$$2.5CaSO_4 + Mg_{0.5}H_2Acon + H_3Acon + 0.5H_2SO_4$$

then it is seen from a consideration of the products of the reaction that essentially only the magnesium will be present in the solution obtained giving a relatively low ash.

From these considerations it may be concluded that an equivalent ratio of sulfuric acid to aconitic acid equal to 1.0 will give a maximum extraction of the aconitic acid and a maximum elimination of ash in the filter cake no matter what the relative proportions of calcium and magnesium in the calcium magnesium aconitate salts may be without introducing undue excesses of sulfuric acid. In the table that follows data are presented which illustrate the relationships between the amounts of sulfuric acid employed in the acidification treatments and the amounts of ash present in the aconitic acid solutions obtained therefrom.

It is also believed that the amounts of ash present in the solutions obtained by acidification with sulfuric acid is to some extent dependent upon the degree to which the aconitic acid in the mixture is ionized. As the equivalent ratio of sulfuric acid to aconitic acid is increased the ionization of the aconitic acid is suppressed by the increased hydrogen ion concentration thus decreasing the availability of the complexing aconitic acid ions and causing the precipitation of a greater amount of the cations as insoluble salts. Thus an insoluble metal sulfate may be held in solution by the sequestering action of the aconitate ion, i. e.

$$3M^{++} + 2Acon^{---} \rightleftharpoons M_3Acon_2 \text{(soluble)}$$

but suppression of the aconitic acid ionization by increased hydrogen ion concentration, i. e., $$3H^+ + Acon^{---} \rightleftharpoons H_3Acon$$

will cause the complexed metal to be precipitated, i. e.

$$M^{++} + SO_4^= \rightleftharpoons MSO_4 \text{(insoluble)}$$

The following table illustrates the relationships between the amount of sulfuric acid employed in the acidification treatments and the amounts of ash present in the aconitic acid solutions obtained from CMA prepared from two different samples of molasses.

The calcium magnesium aconitate used in runs Nos. 1 and 2 was a thoroughly washed material which had been precipitated from a Louisiana molasses. It analyzed as follows: per cent aconitic acid=38.8, per cent free moisture=38.2. The calcium magnesium aconitate used in run No. 3 was a thoroughly washed material which had been precipitated from a Cuban molasses. It analyzed as follows: per cent aconitic acid=36.6, per cent free moisture=39.0.

In runs Nos. 1 and 3 the calculated amount of calcium magnesium aconitate to give the desired equivalent ratio of sulfuric acid to aconitic acid was added portionwise to a fixed amount of sulfuric acid solution with mechanical stirring. The concentration of the sulfuric acid was such that the solution resulting from the reaction contained 10–15% aconitic acid. The reaction was carried out at room temperature (25–30° C.). After a reaction time of 0.5 hr., the mixture was filtered and the residual cake was washed with water. The combined filtrate and washings was analyzed for aconitic acid and ash.

In run No. 2 the calculated amount of 25% sulfuric acid to give the desired equivalent ratio of sulfuric acid to aconitic acid was slowly added to a mechanically stirred slurry containing a fixed amount of calcium magnesium aconitate. The calcium magnesium aconitate slurry contained an amount of water such that the solution resulting from the reaction contained 10–15% aconitic acid. The reaction was carried out at room temperature (25–30° C.). After a reaction time of 0.5 hr. the reaction mixture was filtered and the residual filter cake was washed with water. The combined filtrate and washings was analyzed for aconitic acid and ash.

Acidification and recovery of aconitic acid from calcium magnesium aconitate

| | Equivalent Ratio of $H_2SO_4$ to Aconitic Acid | pH Value of Reaction Mixture | Percent Aconitic Acid Recovered in Combined Filtrate and Wash | Grams of Sulfated Ash per Gram Aconitic Acid in Combined Filtrate and Wash |
|---|---|---|---|---|
| Run 1 (Cake added to acid) | 0.55 | 3.1 | 80 | 0.540 |
| | 0.65 | 3.0 | 98 | 0.479 |
| | 0.75 | 2.7 | 99 | 0.294 |
| | 0.85 | 2.4 | 99 | 0.256 |
| | 0.92 | 2.3 | 97 | 0.175 |
| | 0.95 | 2.0 | 99 | 0.146 |
| | 1.00 | 1.7 | 99 | 0.146 |
| | 1.05 | 1.5 | 99 | 0.118 |
| | 1.10 | 1.1 | 99 | 0.131 |
| Run 2 (Acid added to cake) | 0.55 | 3.2 | 90 | 0.438 |
| | 0.65 | 3.0 | 99 | 0.400 |
| | 0.75 | 2.7 | 99 | 0.336 |
| | 0.85 | 2.4 | 99 | 0.180 |
| | 0.92 | 2.3 | 99 | 0.153 |
| | 0.95 | 2.1 | 99 | 0.150 |
| | 1.00 | 1.8 | 99 | 0.139 |
| | 1.05 | 1.4 | 99 | 0.137 |
| | 1.10 | 1.0 | 99 | 0.110 |
| Run 3 (Cake added to acid) | 0.50 | 3.0 | 70 | 0.564 |
| | 0.60 | 3.0 | 74 | 0.535 |
| | 0.70 | 2.8 | 98 | 0.422 |
| | 0.80 | 2.6 | 99 | 0.378 |
| | 0.90 | 2.2 | 98 | 0.322 |
| | 1.00 | 1.8 | 99 | 0.304 |
| | 1.10 | 1.2 | 99 | 0.344 |

The two methods of mixing referred to in the table, i. e., the addition of the acid to the cake and the addition of the cake to the acid give similar results.

In treating the crude salts with the dilute sulfuric acid, however, it is important to use dilute acid rather than to add concentrated acid and subsequently add the water for dilution, to avoid coating the particles with calcium sulfate which slows or retards the migration of aconitic acid out of the particles. Thus, in treating a wet calcium magnesium aconitate cake as recovered from the precipitation process, and after thorough washing with water, the cake may have the following typical analytical range: Moisture 35–45%; aconitic acid 20–40%; calcium 5–11% and ash 14–29%. Such cake is treated with an amount of sulfuric acid in the presence of sufficient water so that the solution produced by the reaction contains 10–20% aconitic acid.

The temperature of treatment of the crude salts with the dilute sulfuric acid is also advantageously maintained at as low a temperature as is economically feasible, instead of using the high temperatures that have heretofore been proposed. The use of a low temperature minimizes the extraction of the color into the solution and thus in effect minimizes the subsequent refining which must be applied in order to produce aconitic acid of acceptable quality. The temperature ordinarily should not exceed 50° C. and is advantageously kept at 30° C. or below.

It has been found that the color bodies which occur in molasses are acidic in nature and are also precipitated as calcium and magnesium salts along with the aconitic acid. These salts of color acids may be present in the crude alkaline earth aconitates in an amount equivalent to around 5 to 10% of the total weight of the crude aconitate. These color acids are of varying molecular weight since they are formed by polymerization of degradation products of the sugars present in molasses during the processing accompanying the extraction of the sugar. Depending upon the molecular weight of the color acid it may be insoluble as the free acid or colloidal in nature or soluble. Furthermore, it appears that the strength of the acid and its pH value at neutrality is also a function of molecular size.

Accordingly, in treating the crude alkaline earth aconitates with sulfuric acid, it is important that the aconitic acid be preferentially extracted, and it has been found that this can be done by keeping the temperature at around 30° C. or below. Under these conditions the aconitic acid is preferentially released into the liquid phase and migration of the color acids, at least those of higher molecular weight, is retarded, so that the amount of colored substances in the extract is of the order of 1% instead of the much higher figure of the starting material.

Under some circumstances it may be desirable to operate at a somewhat higher temperature, for example, where it is more economical to apply multiple recrystallization than to provide low temperature water; but it is not advisable to operate at temperatures over 50° C.

In the treatment of alkaline earth aconitate salts with sulfuric acid under the conditions indicated it has been found that the reaction is instantaneous for all practical purposes and that as much as 99% of the aconitic acid may be removed in about 3 minutes. When treating a thoroughly washed alkaline earth aconitate with sulfuric acid at room temperature (25–35° C.) a prolonged reaction time does not cause an increase in the amount of color present in the aconitic acid solution obtained. However, when an alkaline earth aconitate which has not been thoroughly washed is used, it has been found that prolonged agitation and contact of the liquid and solid tends to increase the color of the aconitic acid extract.

After the alkaline earth aconitates are treated with the dilute sulfuric acid in the manner described the resulting slurry is filtered to remove the insoluble matter which is primarily calcium sulfate. This filtration may be carried out in conventional equipment, either as a batch operation or continuously.

This filtration separates insoluble coloring matter as well as precipitated inorganic material such as calcium sulfate and gives a filtrate in the form of an aconitic acid solution having typically the following composition:

| | |
|---|---|
| AcA, per cent | 15 – 20 |
| Total ash, per cent | 2.0 – 3.5 |
| Mg, per cent | 1.0 – 2.0 |
| Ca, per cent | 0.02– 0.6 |
| $H_2SO_4$, per cent | 0.1 – 2.0 |
| Color acids, per cent | 0.5 – 2.0 |
| pH value | 1.4 – 2.1 |

Although the treatment above described reduces or minimizes the extraction of color from the crude salts, it is advantageous to effect a further treatment of the aconitic acid solution and a further removal of color before passing the solution to the cation exchange treatment. This acid solution can advantageously be treated by a colloidal clay such as bentonite. The bentonite is a swelling type and used in the form of a slurry containing 5% of bentonite by weight, which slurry has been aged for about 24 hours before using. This slurry is added to the filtrate in an amount equivalent to about 1% by weight of bentonite paste on the total solids in the filtrate, or within the range of 0.5 to 5% based on the total solids. The bentonite treated liquor is held for about 15 minutes, or between 5 and 30 minutes, at a temperature of around 30° C., or between 20 and 50° C., and the liquor is then filtered in conventional filtering equipment. The color removal by such treatment has been found to be from about 10 to 30% of that contained in the filtrate at this point.

For additional color removal prior to treatment with the cation exchange resin, the filtrate from the bentonite treatment is advantageously passed through a decolorizing resin. Such decolorizing resins are combination anion and cation exchangers and effect no change in the pH value of the solution under treatment. Such a type of resin is exemplified by the resin sold under the trade name "Permutit Resin SD-102."

Passage of the filtrate through a column of the resin effectively removes practically all of the coloring material remaining in the solution. Such a resin is regenerated by consecutive treatment with caustic soda, e. g., 3% solution, and sulfuric acid, e. g., 3% solution, followed by treatment with water until a neutral salt-free effluent is obtained. One volume of such resin so regenerated was found capable of removing up to 90% of the color in 20 volumes of the bentonite-treated aconitic acid solution, corresponding to around 70 to 90% removal of coloring matter without removal of any substantial amount of aconitic acid. The temperature of treatment is around 30 to 80° C.

The resulting decolorized solution of aconitic acid which still contains a large part of the original magnesium content of the crude aconitates, is then passed through a column of strong acid cation resin to effect removal of cations such as magnesium from the aconitic acid solution. Substantial quantities of ash, notably magnesium, are removed in this way. A typical acid cation resin is a sulfonated polystyrene-divinylbenzene resin previously treated with a strong mineral acid to convert it to the acid form. Treatment of the aconitic acid solution with such resin removes practically all of the remaining inorganic cations and leaves an aconitic acid solution of high purity typified by the following approximate analysis, based on the solids content of the solution:

| | | Ranges |
|---|---|---|
| AcA | 99.0 | (91–99) |
| Mg | 0.10 | 0.02–0.9 |
| $H_2SO_4$ | 0.65 | 0.10–5.0 |
| Color | 0.24 | 0.1–0.5 |

This treatment of the aconitic acid solution by the cation exchanger, to effect removal of magnesium and residual calcium, eliminates the necessity for any subsequent fractional crystallization to remove these salts and makes it possible to recover a large proportion of the aconitic acid from the solution by concentration and crystallization before the residual mother liquors are returned to the process. It also allows these mother liquors to be used directly without prior treatment by neutralization.

The cation removal from the solution is at a lower pH than is conventionally used with such resins; but the use of this low pH range, between 2.2 and 0.5, does not greatly reduce the capacity of the resin. It is important that a strong acid resin, such as the polysulfonic acid type, be used, rather than a weak acid resin, such as the carboxylic type. The treatment of the solution with the resin is at a temperature of around 20 to 80° C.

The effluent from the cation exchange treatment is substantially a pure aconitic acid solution and may be crystallized directly to provide solid aconitic acid of high purity, e. g., around 99.5% or better. Removal of successive crops of aconitic acid by concentration and crystallization may be continued until the free sulfuric acid concentration is of the order of 20% at which time the mother liquor is returned to the original sulfuric acid make-up for extraction of further alkaline earth aconitates.

The aconitic acid solution, after the cation exchange treatment, will contain a small amount of sulfuric acid but will be free from any large amount, although the amount will increase on concentration and crystallization of the aconitic acid. In general the effect of small amounts of sulfuric acid on crystallization is beneficial, since it acts both to lighten the color of the finished product and also to decrease the solubility of aconitic acid in water, thus allowing a larger amount to be removed per crystallization. Any sulfuric acid adhering to the aconitic acid may be substantially completely removed from the crystal surfaces by washing with water.

The present process enables a high over-all yield of aconitic acid to be recovered from the crude aconitates. The yield will vary somewhat, depending upon the degree to which the acid is crystallized and the mother liquors are returned, but over-all yields of up to 95% of aconitic acid can be obtained.

Diagrammatic flow sheets illustrative of the process of the present invention are shown in the accompanying drawing, in which Fig. 1 is a flow sheet illustrating the combination of acid treatment and subsequent cation exchange treatment to produce an aconitic acid solution substantially free from magnesium and other cations;

In the accompanying drawings the calcium magnesium aconitate material treated is indicated by the abbreviation CMA.

Figure 1:
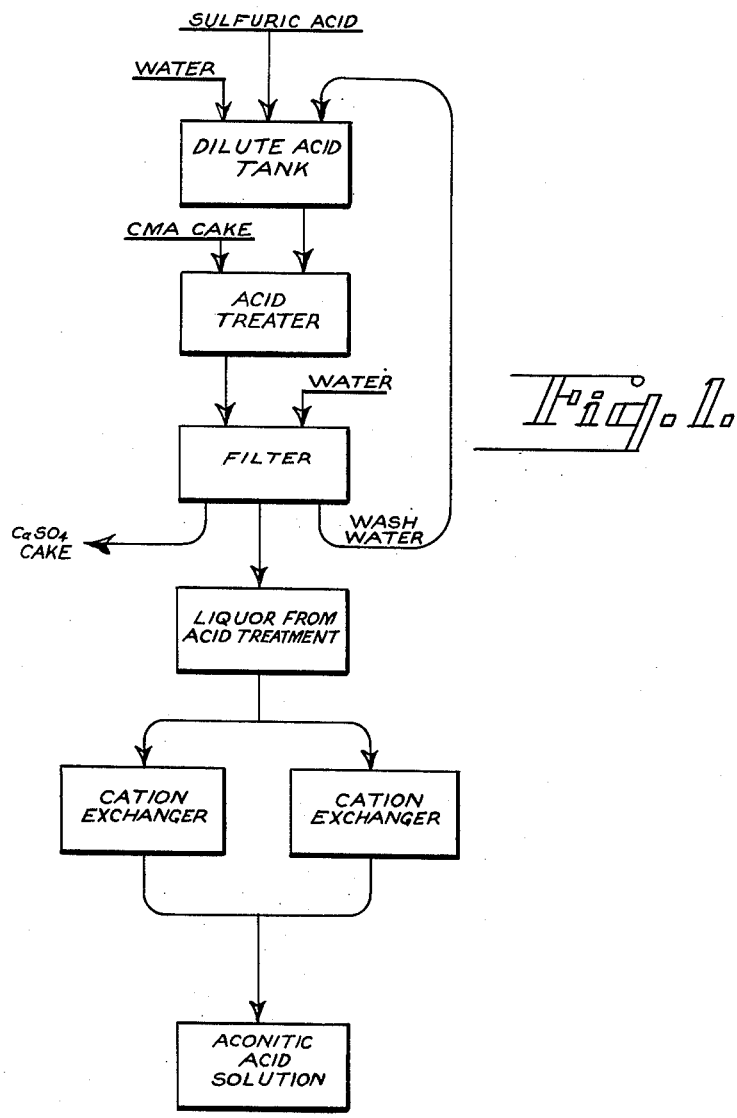

In the simplified flow sheet of Fig. 1 the dilute sulfuric acid for treating the CMA cake is formed by diluting concentrated sulfuric acid with water in the dilute acid tank and this dilute acid is mixed with the CMA cake in proper proportions in the acid treater. The precipitate formed is removed in the filter and is washed with water and the water returned to the dilute acid tank.

The liquor from the acid treatment, advantageously with decolorizing treatment to remove part of the coloring material, is then passed to one or the other of the cation exchangers where the magnesium and other cations are removed to give the aconitic acid solution substantially free from such cations.

Figure 2:
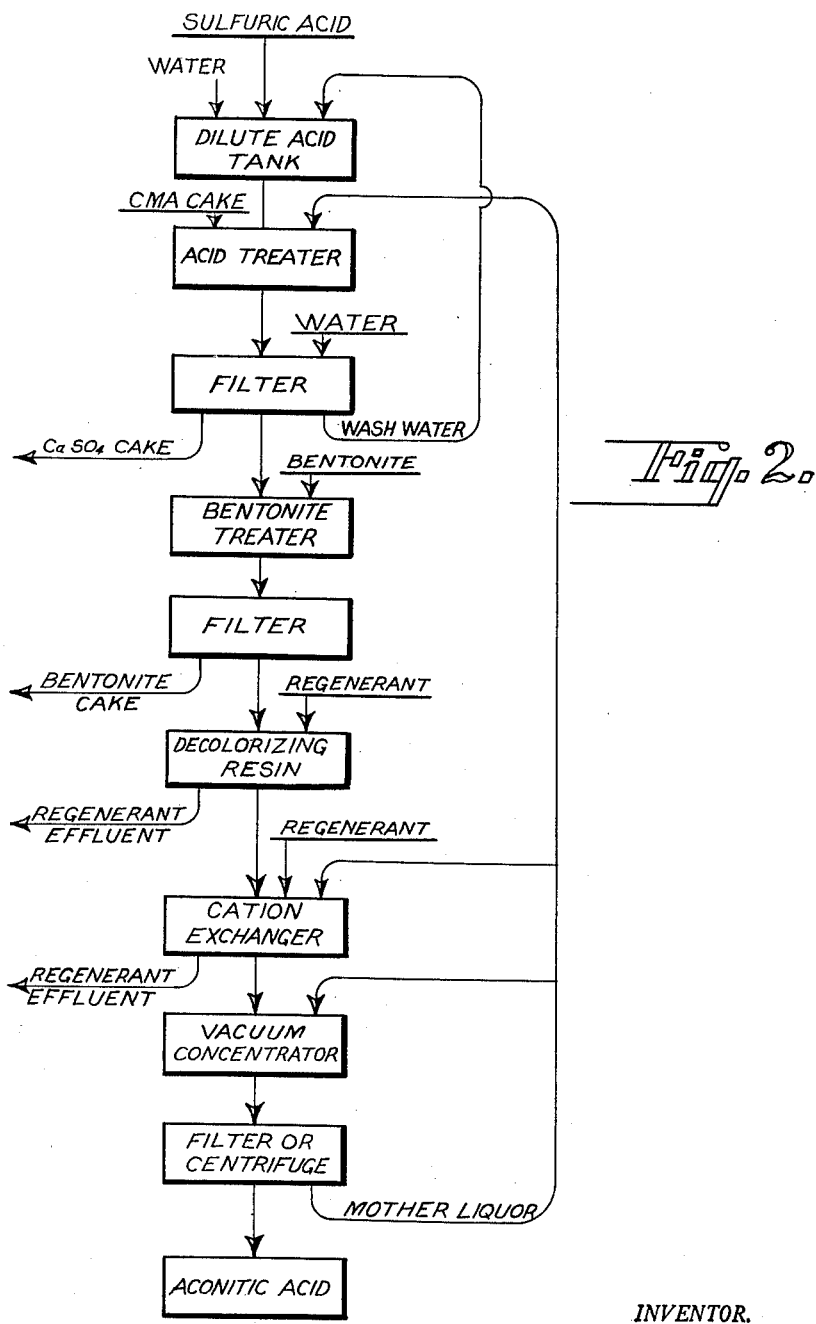
Fig. 2 is a flow sheet illustrating the process with the bentonite treatment and decolorizing resin treatment prior to the treatment with the deionizing resin, and including the crystallization of the aconitic acid.

The diagrammatic flow sheet of Fig. 2 is similar to that of Fig. 1 but includes a bentonite treater for the filtrate and a filter to remove the bentonite cake. This flow sheet also includes a decolorizing resin treatment of the filtrate before it goes to the deionizing resin or cation exchanger. Regenerants for the decolorizing resin and for the deionizing resin are indicated conveniently for regenerating the resins. The solution of aconitic acid from the cation exchanger passes to a vacuum concentrator to concentrate the solution and precipitate aconitic acid which is removed by a filter or centrifuge to give aconitic acid which may be further purified by recrystallization or used directly after drying as an aconitic acid product. The mother liquor from the final filtrate of the aconitic acid can be returned directly to the vacuum concentrator or to the cation exchanger but where this mother liquor is of high acidity it is advantageously returned to the acid treater where its acid will be utilized in the treatment of additional amounts of CMA cake and its aconitic content will be recovered in subsequent treatment.

Figure 3:
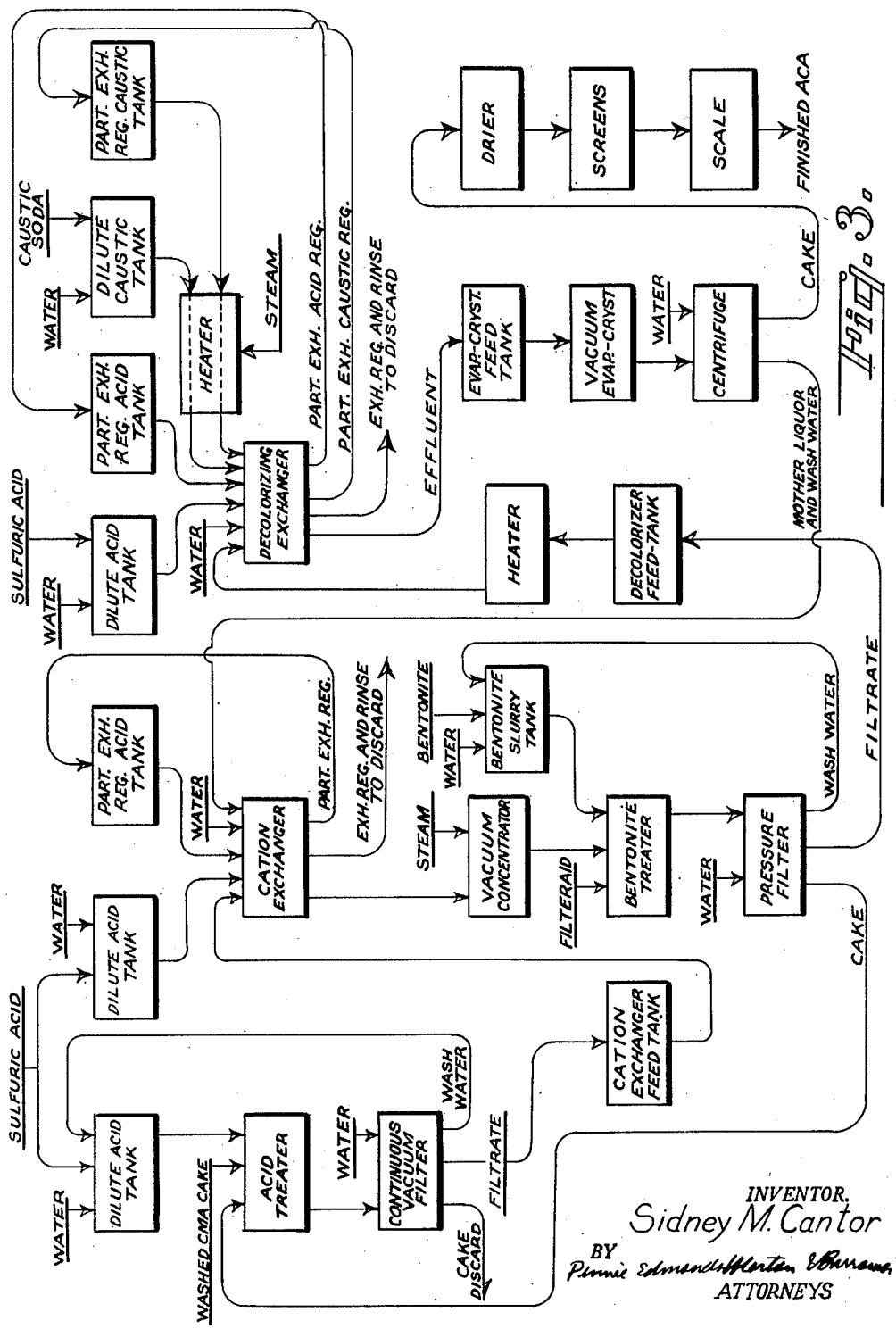
Fig. 3 is a somewhat more complete flow sheet illustrating the process with one crystallization only of the aconitic acid.

In the flow sheets of Fig. 3 the washed CMA cake is similarly treated with dilute acid in an acid treater, the calcium sulfate cake removed in a continuous vacuum filter; and the wash water from the cake returned to the dilute acid tank. The filtrate goes to the cation exchanger tank and then to the cation exchanger where the magnesium and other cations are removed; after which the aconitic acid solution passes to the vacuum concentrator where it is partially concentrated before treatment with the bentonite slurry supplied from the bentonite slurry tank. After the bentonite treatment, filter aid is added and the material filtered in a pressure filter and the precipitate or cake filtered out returned to the acid treater. The wash water from the washing of the bentonite cake on the filter is returned to the bentonite slurry tank. The filtrate from the pressure filter goes to the decolorizer feed tank and then to a heater where it is heated before passing to the decolorizing exchanger. In this case the decolorizing exchanger is arranged subsequently to the cation exchanger. From the decolorizing exchanger the effluent passes to an evaporator crystallizer and then to a centrifuge where the precipitated aconitic acid is removed as a cake and passed to the drier and then over screens and finally to a weighing scale to give the finished aconitic acid.

From the centrifuge the mother liquor and wash water are returned to the cation exchanger.

In Fig. 3 the cation exchanger is shown as connected with a dilute acid tank for regenerating the acid resin and the partly exhausted regenerating acid is returned to a tank for further use. The acid which has become exhausted is discarded together with the rinse water.

The decolorizing exchanger is also shown as provided with a dilute acid tank and a dilute caustic tank for supplying dilute acid and dilute caustic for regenerating with return of the partially exhausted acid and caustic to tanks for reuse and with final discharge of the exhausted regenerating acid and alkali.

Figure 4:
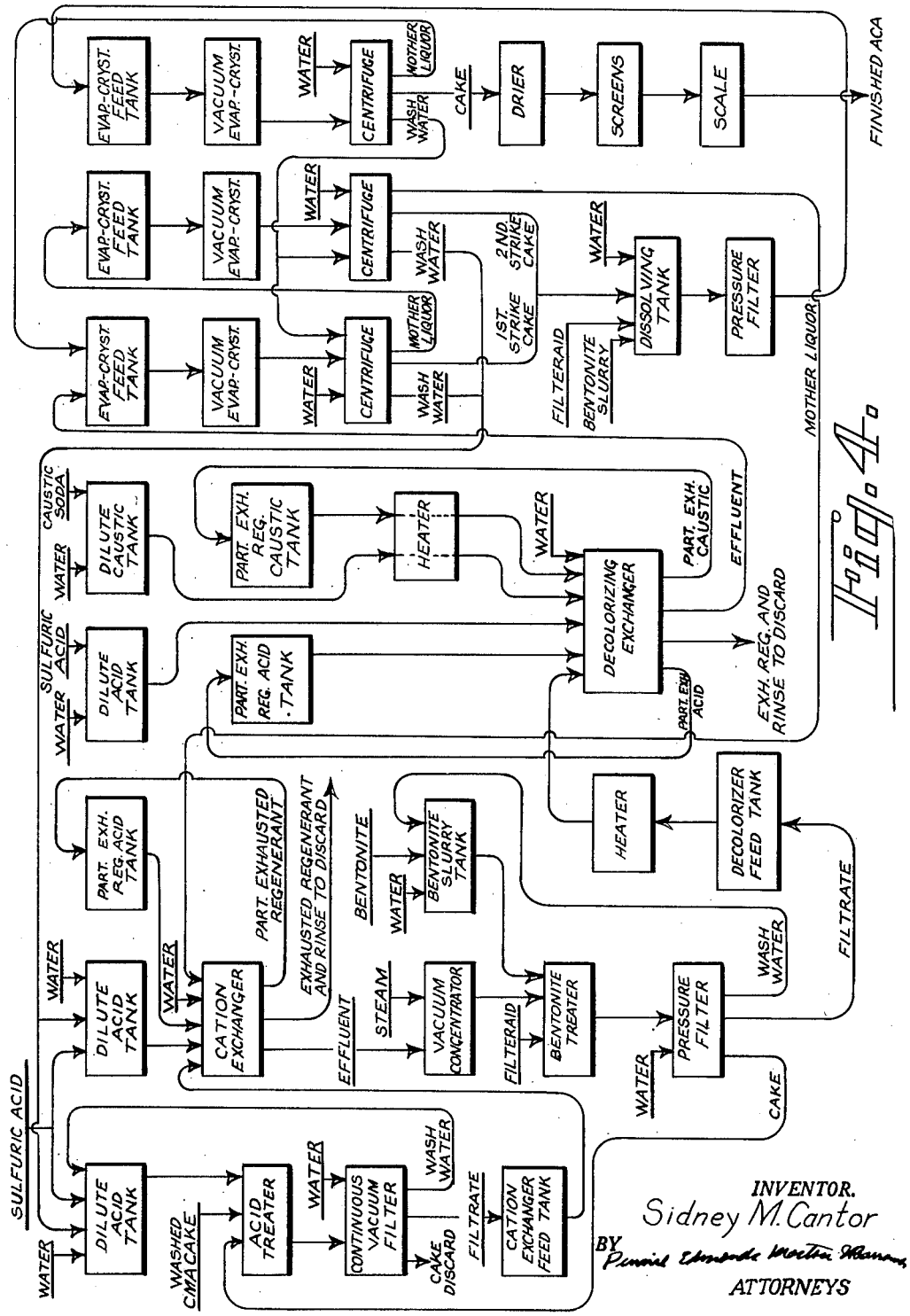
Fig. 4 shows a flow sheet with two successive crystallizations followed by recrystallization of the aconitic acid.

The diagrammatic flow sheet of Fig. 4 is similar to that of Fig. 3, up to the point where the aconitic acid solution passes from the decolorizing exchanger. Instead of a single crystallization as in the flow sheet of Fig. 3 the solution is subjected to two successive crystallizations. The solution from the decolorizing exchanger passes first to an evaporator crystallizer feed tank and then to a vacuum evaporator crystallizer where it is concentrated and aconitic acid crystals formed. These are removed in the centrifuge and form the so-called 1st strike cake. The mother liquor passes to a second evaporator crystallizer feed tank and then to a vacuum evaporator crystallizer where further concentration takes place. The second set of crystals of aconitic acid is removed in a centrifuge and forms the 2nd strike cake of the flow sheet. These two cakes are mixed and passed to a dissolving tank where the aconitic acid is dissolved in water, then treated with bentonite slurry and a filter aid and filtered in a pressure filter. The resulting solution passes to another evaporator crystallizer feed tank and then to another vacuum evaporator crystallizer where the solution is concentrated to crystallize the aconitic acid therefrom. These crystals are separated in the centrifuge, washed with water to remove adhering sulfuric acid, and the resulting cake dried, ground if necessary, screened and weighed on the scale and is the finished aconitic acid.

In the flow sheet of Fig. 4 the wash water from the washing of the two successive crops of crystals which form the 1st and 2nd strike cakes is shown as being returned to the dilute acid tank. The mother liquor from the second crystallization and second centrifuge is shown as returned to the cation exchanger. The wash water from the final recrystallization and centrifuge is shown as being returned to the centrifuges of the first and second crystallizations to serve as wash water therefor. The mother liquor from the final crystallization and centrifuge is shown as being returned to the first evaporator crystallizer feed tank.

The arrangement and sequence of steps and operations shown in the flow sheets are partially advantageous, enabling high purity aconitic acid to be obtained with a minimum of operations and of recycling of process liquors to minimize losses. The aconitic acid solution is freed from magnesium before crystallizing the aconitic acid so that no subsequent treatment to remove magnesium sulfate by crystallization is necessary.

The amount of free sulfuric acid present in the process is minimized. The amount of color entering the liquid phase with the aconitic acid is minimized. And the number of crystallizations required to produce commercially acceptable aconitic acid is minimized; while the residual aconitic acid solution or mother liquor can be recycled without special handling.

The invention will be further illustrated by the following specific examples. The parts are by weight.

*Example 1.*—154 parts of a thoroughly washed calcium magnesium aconitate cake, precipitated from Louisiana molasses and containing 38.8% aconitic acid and 38.2% moisture, was added to 215 parts of a 15.3% sulfuric acid solution containing 32.8 parts of sulfuric acid corresponding to an equivalent ratio of sulfuric acid to aconitic acid equal to 0.65. The pH value of the resulting slurry was 3.0. The reaction mixture was stirred at 30° C. for 0.5 hr., then filtered, and the filter cake washed with 125 parts of water. The combined filtrate and washings contained 16.9% aconitic acid; 8.1% ash (sulfated); 1.3% calcium; 0.09% sulfate; and 0.75% magnesium. The aconitic acid recovered in the solution amounted to 98% of theoretical.

This example illustrates the treatment of a calcium magnesium aconitate salt using an equivalent ratio of sulfuric acid to aconitic acid of 0.65.

*Example 2.*—In a run similar to that of Example 1, 90 parts of calcium magnesium aconitate cake identical in composition to that used in Example 1 was added to 215 parts of a 15.3% sulfuric acid solution containing 32.8 parts of sulfuric acid corresponding to an equivalent ratio of sulfuric acid to aconitic acid equal to 1.1. The pH value of the resulting slurry was 1.0. The reaction mixture was stirred at 30° C. for 0.5 hr., then filtered, and the filter cake washed with 125 parts of water. The combined filtrate and washings contained 10.5% aconitic acid; 1.38% ash (sulfated); 0.02% calcium; 1.6% sulfate; and 0.26% magnesium. The aconitic acid recovered in the solution obtained amounted to 99%.

This example illustrates the treatment of a calcium magnesium aconitate salt using an equivalent ratio of sulfuric acid to aconitic acid of 1.1.

*Example 3.*—In a run similar to those of Examples 1 and 2, 100 parts of calcium magnesium aconitate cake from Louisiana molasses identical in composition to that used in Examples 1 and 2, was added to 215 parts of a 15.3% sulfuric acid solution containing 32.8 parts of sulfuric acid corresponding to an equivalent ratio of sulfuric acid to aconitic acid equal to 1.0. The pH value of the resulting slurry was 1.7. The reaction mixture was stirred at 30° C. for 0.5 hr., then filtered, and the filter cake washed with 125 parts of water. The combined filtrate and washings contained 12.2% aconitic acid; 1.6% ash (sulfated); 0.02% calcium; 0.70% sulfate; and 0.30% magnesium. The aconitic acid recovered in the solution obtained amounted to 99%.

This example illustrates the treatment of a calcium magnesium aconitate salt using an equivalent ratio of sulfuric acid to aconitic acid of 1.0.

*Example 4.*—100 parts by weight of a thoroughly washed calcium magnesium aconitate cake, which had been precipitated from a Louisiana molasses, containing 38.8% aconitic acid and 38.2% moisture was added to 215 parts of a 15.3% sulfuric acid solution containing 32.8 parts of anhydrous sulfuric acid. The equivalent ratio of sulfuric acid to aconitic acid used was 1.0, and the pH value of the resulting mixture was 1.7. The reaction mixture was stirred at 30° C. for 30 minutes, filtered and the filter cake was washed with 125 parts of water.

The combined filtrate and washings contained 12.2% aconitic acid, 0.03% calcium, 0.67% sulfate, 1.71% ash (sulfated), 0.33% magnesium and optical density or color readings of 1.22. This solution was given a decolorization treatment with bentonite using 1% by weight of a 5% bentonite paste based on the total solids in the solution. Whereupon the optical density was reduced to 0.92.

This solution which now amounted to 375 parts by volume was passed through a column containing 20 parts by volume of freshly regenerated decolorizing resin (Permutit SD-102). The color of the effluent and wash combined (425 parts by volume) was now 0.14.

736 parts by volume of decolorized effluent from two combined runs was passed through a column containing 283 parts by volume of a strongly acidic cation exchanger of the sulfonated polystyrene-divinylbenzene type which had been previously activated by treating with 10% sulfuric acid in the customary manner. The first 589 part volumes of the effluent contained less than 0.003 part of calcium and less than 0.03 part of magnesium, the limits of the analytical methods used. The next 147 part volumes contained 0.014 part of calcium and 0.23 part of magnesium, while the next 147 part volumes contained 0.016 part of calcium and 0.22 part of magnesium. The final 147 part volumes contained less than 0.003 part of calcium and 0.20 part of magnesium. The aconitic acid solution retained in the resin column had been displaced using 294 parts of water during this treatment. Approximately 70% of the magnesium and 80% of the calcium was removed from the aconitic acid solution. The combined effluent from the ion exchange treatment contained 8.7% aconitic acid, 0.004% calcium, and 0.07% magnesium.

This solution (1000 parts by volume) when crystallized provided two crops of aconitic acid which amounted to 75% of that contained in solution or 65 parts by weight. This acid when dried contained 99.3% aconitic acid, 0.3 sulfate, and 0.3 moisture.

I claim:

1. A process of recovering aconitic acid from calcium magnesium aconitates containing alkaline earth salts of color acids which comprises treating the aconitates at a temperature not exceeding about 30° C. with dilute sulfuric acid in amount sufficient to convert the calcium of the aconitates into calcium sulfate but not materially in excess of that equivalent to the aconitic acid content of the aconitates, separating the resulting solution from the precipitate formed, passing the solution through a cation exchange resin to remove practically all of the magnesium therefrom and concentrating the resulting solution to crystallize aconitic acid therefrom.

2. A process according to claim 1 in which the solution, after separation from the precipitate, is treated with a small amount of colloidal clay and again filtered before passing through the cation exchange resin.

3. A process according to claim 1 in which the solution, after separation from the precipitate, is subjected to a decolorizing resin treatment before passing through the cation exchange resin.

4. A process according to claim 1 in which the solution, after separation from the precipitate, is subjected to treatment with a small amount of colloidal clay and again filtered and then treated with a decolorizing resin before passing through the cation exchange resin.

5. A process according to claim 1 in which the solution, after passing through the cation exchange resin, is further treated with a decolorizing resin before concentration to crystallize aconitic acid therefrom.

6. A process according to claim 1 in which the amount of dilute sulfuric acid is sufficient to give a pH of the resulting slurry of about 1 to 3.

7. A process according to claim 1 in which the amount of dilute sulfuric acid is sufficient to give a pH of the resulting slurry of about 1.4 to 2.1.

8. A process according to claim 1 in which the equivalent ratio of sulfuric acid used to aconitic acid content of the aconitates is between about 0.65 and 1.1.

9. A process according to claim 1 in which the equivalent ratio of sulfuric acid used to aconitic acid content of the aconitates is between about 0.95 and 1.05.

10. A process of recovering aconitic acid from calcium magnesium aconitates containing alkaline earth salts of color acids which comprises adding the aconitates to dilute sulfuric acid in amount sufficient to convert the calcium of the aconitates into calcium sulfate at a temperature below about 30° C., separating the resulting solution from the precipitate formed after a short time, not exceeding fifteen minutes, passing the solution through a cation exchange resin to remove practically all of the magnesium therefrom and concentrating the resulting solution to crystallize aconitic acid therefrom.

11. A process of recovering aconitic acid from calcium magnesium aconitates containing alkaline earth salts of color acids which comprises treating the aconitates at a temperature below about 30° C. with dilute sulfuric acid in sufficient amount to give an equivalent ratio of sulfuric acid to aconitic acid content of the aconitates of about 0.65 to 1.1, separating the resulting solution from the precipitate formed, treating the solution with a small amount of colloidal clay and again filtering the solution, subjecting the solution to a decolorizing resin treatment, passing the solution through a cation exchange resin to remove practically all of the magnesium therefrom and concentrating the resulting solution to crystallize aconitic acid therefrom.

SIDNEY M. CANTOR.

References Cited in the file of this patent

UNITED STATES PATENTS

| Number | Name | Date |
|---|---|---|
| 2,253,061 | Cole | Aug. 19, 1941 |
| 2,345,079 | Ventre et al. | Mar. 28, 1944 |
| 2,514,010 | Reeves | July 4, 1950 |

FOREIGN PATENTS

| Number | Country | Date |
|---|---|---|
| 450,738 | Great Britain | July 23, 1936 |